(No Model.)
J. C. BAYLES.
FLEXIBLE METALLIC HOSE.
No. 445,153. Patented Jan. 27, 1891.
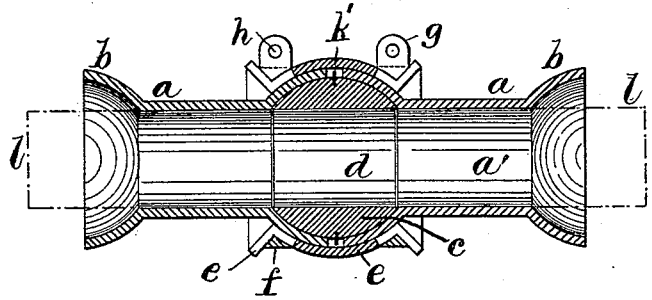
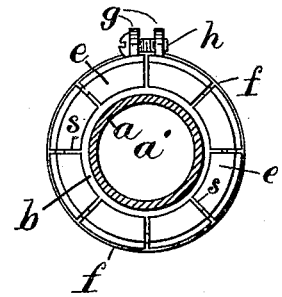
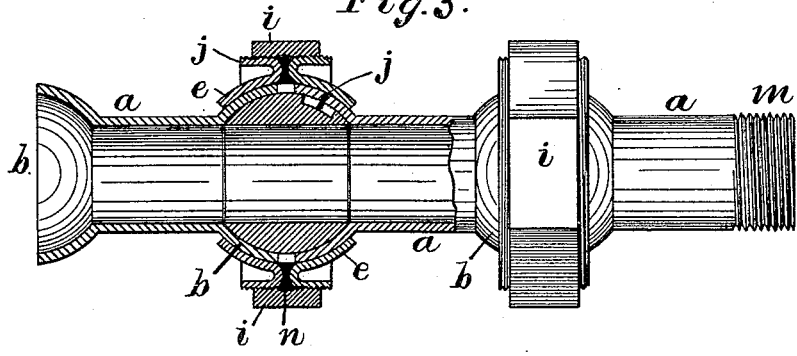
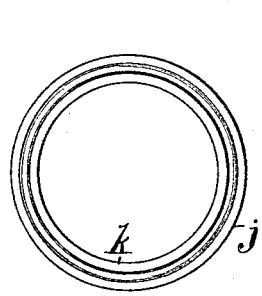
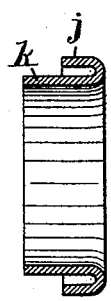
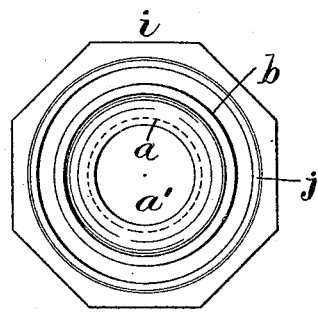
Fig. 4. Fig. 5. Fig. 6.
Attest:
L. Lee,
F. C. Fischer.
Inventor.
James C. Bayles, per
Crane & Miller, attys.

UNITED STATES PATENT OFFICE.

JAMES C. BAYLES, OF EAST ORANGE, NEW JERSEY.

FLEXIBLE METALLIC HOSE.

SPECIFICATION forming part of Letters Patent No. 445,153, dated January 27, 1891.

Application filed May 31, 1890. Serial No. 353,807. (No model.)

*To all whom it may concern:*

Be it known that I, JAMES C. BAYLES, a citizen of the United States, residing at East Orange, Essex county, New Jersey, have invented certain new and useful Improvements in Flexible Metallic Hose, fully described and represented in the following specification and the accompanying drawings, forming a part of the same.

The object of the present invention is to furnish a flexible hose made wholly of metal for use between the cars of railroad-trains to conduct steam or air for use in heating the cars or operating air-brakes.

Heretofore it has been common to use india-rubber hose in connecting steam or air fixtures upon such cars; but such hose deteriorates and is liable to unexpected rupture.

The invention consists in a series of spools provided at their opposite ends with spherical cups combined with perforated spherical balls inserted within the cups and divided spherical covers applied outside the cups and clamped adjustably upon the same to press them toward the balls. By this construction a double joint is formed, which effectively prevents the escape of air or steam, while it permits of movement at frequent intervals in the length of the hose.

The invention will be understood by reference to the annexed drawings, in which—

Figure 1 is a view of one joint with a compression-clamp to compensate for wear. Fig. 2 is an end view of the same with the spool in section. Fig. 3 is a side view, partly in section where hatched, of two joints with a threaded clamp. Figs. 4 and 5 are an end view and section of the thimble-blank for the threaded clamp, and Fig. 6 an end view of parts in Fig. 3.

The pipe-sections or spools $a$ are formed with sockets or cups $b$ at each end, fitted to balls $c$, perforated each with hole $d$, corresponding in size with the bore $a'$ of the spool. The balls and cups are formed accurately to a spherical shape and are locked together by a cover $e$, which is applied over the outside of the adjacent cups. The cups are made of perfectly-uniform thickness, and are thus adapted to move smoothly between the cup and cover when the several spools are inclined toward one another in bending the metallic hose.

In Figs. 1 and 2 is shown a means of compensating for the wear of the parts within the cover, the ends of the cover being spun or pressed, so as to form an annular groove, in which a band $f$ is applied, having lugs $g$, adapted to receive a tightening-screw $h$. In this construction the cover is preferably slit a little way from each end at several points $s$ transverse to each groove to facilitate its compression. In any case the tightening of the screw $h$ operates to contract the band and compress the ends of the cover slightly, thus drawing the cups longitudinally and pressing them into closer contact with the ball.

In Fig. 3 the cover is shown divided into two separate hemispherical parts, each of which encircles one of the cups, so that when drawn together the two cups are pressed upon the ball, as desired. The parts of the divided cover are shown drawn together by a threaded collar $i$, which is preferably formed with a right and left hand thread in its opposite ends to draw both the parts of the cover together when the collar is rotated. To adapt the parts of the collar for spinning or pressing upon the cups $b$, the thread is preferably formed upon a cylindrical flange $j$, bent upon a blank $k$ of cylindrical form, as shown in Figs. 4 and 5. Such spherical clamps, when connected by the threaded collar, are applied over the covers with an elastic packing $n$ between them.

The means of connecting the spools by the ball applied inside the cups and the cover applied outside of the same forms a double contact of the parts with the exterior and interior of each cup, and thus forms a greater obstruction to the leakage of fluid than a joint with single contact.

Any number of spools may be connected together in the manner described, so as to form a flexible metallic hose adapted to convey fluid of any kind under pressure, and such metallic hose is therefore a complete substitute for the hose heretofore made of rubber, canvas, and other destructible materials.

To prevent the ball from turning obliquely or transversely to the hole through the spools, I provide a stop consisting in a projection upon the ball or spool. Such stop is shown in Fig. 1 formed as a pin $k'$, projected from the ball between the ends of the spools, which thus prevents the ball from rotating improperly. A pin $j$, projected from the cup into a slot in the ball, is shown in Fig. 3, and other forms of stops may be used, if desired.

In Fig. 1, dotted lines $l$, projected from the ends of the two spools, represent a mandrel such as would be inserted through the spools and ball to support the same during the spinning or pressing of the cover over the cups. The part which chiefly requires support during such operation is the ball $c$, and the mandrel may therefore be made to fit snugly within the ball without reference to a fit within the tubes of the spools.

I am aware that the ball and socket have been used in various constructions to make a swivel-joint; but I am not aware that a series of spools has ever been connected together by ball-and-socket joints, nor that a divided cover has ever been applied to the exteriors of two adjacent cups to draw them together, as set forth herein.

What I claim, and desire to secure by Letters Patent, is—

1. The flexible metallic hose consisting in a series of spools $a$, provided at opposite ends with spherical cups $b$, the perforated spherical balls $c$, applied within the cups, and the covers $e$, divided into two parts and clamped adjustably upon the spherical cups, as and for the purpose set forth.

2. The flexible metallic hose consisting in a series of spools $a$, provided at opposite ends with spherical cups $b$, the perforated spherical balls $c$, applied within the cups, and the covers $e$, divided into two parts and provided each with the threaded flange $j$, coupled together by threaded collar $i$, as and for the purpose set forth.

In testimony whereof I have hereunto set my hand in the presence of two subscribing witnesses.

JAMES C. BAYLES.

Witnesses:
LEWIS C. BAYLES,
THOS. S. CRANE.